United States Patent Office 3,663,605
Patented May 16, 1972

3,663,605
N-PHENETHYLACETAMIDES AND RELATED COMPOUNDS
Ronald J. McCaully, Malvern, and George L. Conklin, Havertown, Pa., assignors to American Home Products Corporation, New York, N.Y.
No Drawing. Continuation-in-part of application Ser. No. 831,726, June 9, 1969. This application May 15, 1970, Ser. No. 37,908
Int. Cl. C07c 69/16, 69/28, 67/00
U.S. Cl. 260—490
30 Claims

ABSTRACT OF THE DISCLOSURE

Novel compounds are prepared by condensing a substituted phenylamine or a phen(lower)alkylamine with a reactive di(lower)alkanoyloxyacetyl compound such as the chloride. The novel compounds are pharmacologically active as central nervous system depressant agents and are of value in the calming of mammals.

CROSS-REFERENCE TO RELATED APPLICATION

This application is a continuation-in-part of application Ser. No. 831,726, filed June 9, 1969, and now abandoned.

DESCRIPTION OF THE INVENTION

The invention is concerned with compounds of Formula I

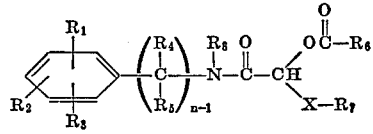

wherein X is selected from the group consisting of

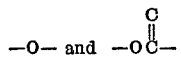

$R_1$, $R_2$ and $R_3$ are selected from the group consisting of hydrogen, (lower)alkyl, (lower)alkoxy, halogen, hydroxy, nitro, carbo(lower)alkoxy, sulfamyl, carbamyl, trifluoromethyl, α-hydroxybenzyl and 2,2-di(lower)alkanoyloxyacetamido.

$R_4$ and $R_5$ are selected from the group consisting of hydrogen, (lower)alkyl, hydroxymethyl, phenyl, (lower)alkoxy, hydroxy, (lower)alkoxyphenyl and di(lower)alkoxyphenyl.

$R_7$ is selected from the group consisting of (lower)alkyl and hydrogen with the proviso that where X is —O—, $R_7$ is (lower)alkyl.

$R_6$ is (lower)alkyl.

$R_8$ is H, (lower)alkyl or phenyl.

$n$ is an integer of 1 to 3.

The compounds of Formula I are central nervous system depressants which are useful is the calming of mammals. The compound of Formula II which is subgeneric to Formula I also are of value as broncodialators for the treatment of asthma and the broncho-restrictive effects of histamine-like compounds

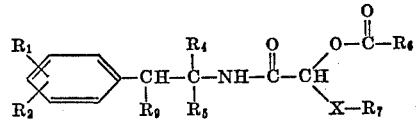

wherein $R_1$, $R_2$, $R_4$, $R_5$, $R_6$, $R_7$ and X are as hereinabove defined; and $R_9$ is selected from the group consisting of hydrogen, (lower) alkoxy and hydroxy.

Particularly valuable compounds of Formula II are those wherein $R_1$ and $R_2$ are hydrogen, methoxy, chloro, nitro or 2,2-diacetoxyacetamido; $R_4$ is hydrogen or methyl; $R_5$ is hydrogen, methyl, hydroxymethyl, phenyl or 3,4-dimethoxyphenyl; $R_6$ is methyl and $R_7$ is methyl, ethyl or hydrogen.

When used herein and in the appended claims, the term "(lower)alkyl" contemplates hydrogen radicals, straight and branched, of from about 1 to about 6 carbon atoms; illustrative members of the group being methyl, ethyl, n-propyl, i-propyl, n-butyl, t-butyl, n-pentyl, n-hexyl and the like. The term "(lower)alkoxy" contemplates hydrocarbonoxy groups of from about 1 to about 6 carbon atoms, straight chain and branched, and includes methoxy, ethoxy, n-propoxy, i-propoxy, n-butoxy, t-butoxy, n-pentoxy, n-hexyloxy, and the like. The term "(lower)alkanoyl" is used to mean acyl groups of 1 to about 6 carbon atoms such as formyl, acetyl, propionyl, butyryl, and the like. The term "carbo(lower)alkoxy" contemplates carbonyl groups substituted with (lower)alkoxy as defined above. By the term "halo" is meant to include, chloro, fluoro, bromo and iodo.

The di(lower)alkanoate compounds of the invention can be prepared from readily accessible starting materials. A convenient pathway is outlined as follows:

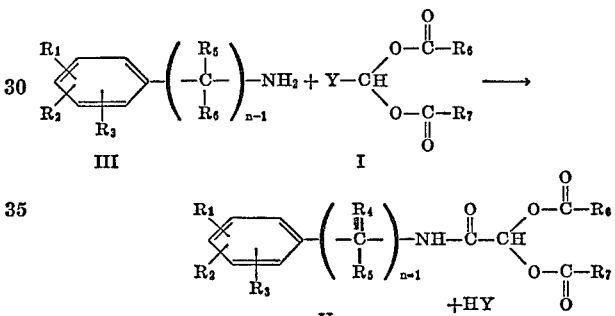

wherein $R_1$, $R_2$, $R_3$, $R_4$, $R_5$, $R_6$, $R_7$ and $n$ are as hereinabove defined. Y is a displaceable group such as halogen, e.g., chloro or bromo or an obvious chemical equivalent thereof. Since the diester function in compounds of Formula IV is extremely susceptible to displacement with nucleophiles, such as reactants of Formula III, the reaction should be carried out in such a manner that at no time is there an appreciable concentration of nucleophile in the presence of the 2,2-dialkanoyloxymethyl function. When the reaction is very useful, in other words, the free amine is added to an excess of the compound of Formula IV. Furthermore, it is generally preferable to conduct the condensation reaction in a homogeneous medium, such as in a chlorinated hydrocarbon solvent, e.g., methylene chloride, in the presence of an acid binding agent, e.g., a tri(lower)alkyl amine, e.g., triethyl amine, preferably at temperatures in the order of about —10° C. to about 100° C. However, the reaction can also be carried out in a two-phase, aqueous base-inert solvent system, such as vigorously stirred mixture of methylene chloride and water, and in this case it is useful to include sodium bicarbonate or an obvious chemical equivalent thereof the acid binding agent. In either case the product of Formula II can be recovered from the inert organic solvent by any conventional means, such as by evaporating the solvent to dryness, which leaves the product as a residue. If desired, the product can be purified by recrystallization from a solvent, such as a (lower)alkanol, e.g., ethanol or isopropanol, and mixtures thereof with water, or from ether. These techniques will be exemplified in detail hereinafter.

The 2-(lower)alkoxy-2-hydroxyacetamidiophenyl and phen(lower)alkyl, (lower)-alkanoates of this invention (i.e., X=—O—, those of Formula Ib) can be prepared from compounds Ia by a pathway outlined as follows:

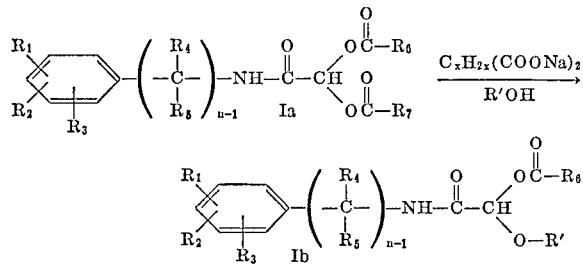

wherein $R_1$, $R_2$ and $R_3$ are hydrogen, (lower)alkyl, (lower)alkoxy, halo, hydroxy, nitro, or carbo(lower)alkoxy and $R_4$, $R_5$, $R_6$, $R_7$ and $n$ are as above defined, $R'$ is (lower)alkyl, $x$ being 0 to 4. To carry out this process the compound of Formula Ia is suspended in about 30–50 parts by volume of the appropriate (lower)alkanol and the mixture is treated with an alkali metal salt of a dibasic organic acid having from 2 to 6 carbon atoms. The reaction is completed by heating to about 80° C. for 5 to 48, preferably 15, hours and preferably in a nitrogen atmosphere. This valuable process is contemplated by the present invention. It is surprising to obtain these results, because with the obvious catalysts, sodium methoxide or alkali metal alkoxide, in general, the desired products Ib are not obtained. Illustrative of the alkali metal salts useful in the process are sodium, lithium and potassium salts of oxalic, malonic, succinic, glutaric, adipic acids, and the like. Preferred is disodium malonate.

Compounds Ib can be recovered in any standard manner. One useful technique comprises filtering off any undissolved solid and then evaporating off the solvent. The residue is treated with water and extracted with methylene chloride. Drying and evaporating the ether extract leaves Ib as a residue. If desired, it can be purified by recrystallization from a solvent such as cyclohexane, or mixtures thereof with ethyl acetate from isopropanol.

The products of Formula I which are (lower)alkanoate, formates, i.e., —X—$R_7$ is —OCOH, can be prepared by reacting glyoxylic acid with a mixed anhydride, such as from formic acid and a (lower)alkanoic anhydride, such as formic-acetic anhydride, to form a reactive intermediate which is then caused to react with an amine of Formula III by a general procedure to be described in detail hereinafter.

Starting materials of Formula III, i.e., β-phenethylamine and derivatives thereof are commercially available or can be prepared by techniques well known to those skilled in the art. Phenethylamine can be prepared by reducing benzylcyanide with sodium and alcohol or lithium aluminum hydride; this is a useful general technique.

Starting materials of Formula IV, the 2,2-dialkanoyoxy-acetyl compounds, may be prepared by techniques described in copending U.S. patent application, R. J. McCaully, Ser. No. 802,345, filed Feb. 26, 1969. To obtain for example α,α-diacetoxyacetyl chloride, glyoxylic acid can be treated with acetic anhydride and acetic acid to form α,α-diacetoxyacetic acid and this can be reacted with thionyl chloride to obtain the acyl chloride according to the following example:

α,α-Diacetoxyacetyl chloride, glyoxylic acid, monohydrate (64.0 g.) and 480 ml. (ca. 520 g.) of acetic anhydride and 160 ml. of glacial acetic acid are combined and heated on a steam bath for 2 hours. The solvents are removed on a rotary evaporator and the remaining traces of acetic acid and acetic anhydride are removed by co-distillation with 100 ml. of toluene. The residue is dissolved in 350 ml. of methylene chloride and treated with 180 ml. (298 g.) of thionyl chloride. The mixture is then heated at gentle reflux for about 20 minutes and evaporated on a rotary evaporator. An additional 100 ml. of methylene chloride is added and re-evaporated to remove traces of volatile reactants. The homologs may be obtained in a similar manner.

The compounds of Formula I of this invention have been found to exert a depressant action on the central nervous system when tested under standard and accepted pharmacological procedures, in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents. Specifically the compounds may be employed to induce a calming effect in animals.

In the pharmacological evaluation of the biological activity of the compounds of this invention, the in vivo effects were tested as follows: The compound was administered orally or intraperitoneally to three mice (14 to 24 grams) at each of the following doses: 400, 127, 40 and 12.7 milligrams per kilogram of host body weight (m.p.k.). The animals were watched for a minimum of two hours during which time signs of general stimulation, (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) were noted.

The compounds of this invention induce central nervous system depressant effects at a dose of about 1.27 to about 400 m.p.k.

The compounds of Formula II of this invention have been found to act as bronchodilators when tested under standard and accepted pharmacological test procedures in animals, such as cats and guinea pigs. They are, therefore, deemed to possess utility in experimental and comparative pharmacology and are of value to treat conditions in animals, such as valuable domestic animals, and in laboratory animals, such as mice, rats, guinea pigs, and the like, responsive to treatment with bronchodilating agents, such as the symptoms of asthma and the broncho-restrictive effects of histamine-like compounds.

In a standard test for bronchodilator activity [modified from Siegmund et al., J. Pharmacol., 90, 254 (1947)] the ability of a compound of Formula II is to protect a guina pig against the bronchoconstrictor effects of a histamine mist is determined. A 0.2% (base) histamine diphosphate solution is atomized and sprayed into a closed chamber for 60 seconds. The guinea pig is then placed into the chamber and observed for asphyxial effects. When convulsions are iminent, the pig is removed from the chamber and allowed to recover. The time from placing the pig in the chamber until convulsions are iminent is recorded and is designated pre-convulsion time. Five pigs are used and control times are obtained for each pig in the morning. Only pigs having control times in the range of 50–100 seconds are used in the test. After a 3.5 to 4 hour recovery period the pigs are administered the drug intraperitoneally and 15 minutes later are again exposed to the histamine aerosol. An animal that can withstand 3 times its morning preconvulsion time is considered completely protected. Individual control (C) and post drug convulsion times (T) are recorded and an activity value calculated by the formula, $(T/C)$. A mean $(T/C)$ value greater than 1.2 indicates activity.

The compounds of Formula II are active as bronchodilators at dosages of from about 25 mg. to about 50 mg. per kilogram of body weight.

DESCRIPTION OF THE PREFERRED EMBODIMENTS

The following examples are given by way of illustration and are not to be construed as limitations of this invention, many variations of which are possible without departing from the scope and spirit thereof.

Eample I.—2,2-dihydroxy-N-(3,4-dimethoxyphenethyl)-acetamide, diacetate

A solution of 21.0 g. of α,α-diacetoxyacetyl chloride in 150 ml. of methylene chloride is added gradually over 20 minutes to a cold, vigorously stirred mixture of 18.1 g. of 3,4-dimethoxyphenethylamine, 200 ml. of methylene chloride, 120 g. of ice and 120 ml. of water containing 16.8 g. of sodium bicarbonate. After the addition is complete, the reaction is vigorously stirred in an ice bath for one hour. The two phases are separated and the methylene chloride extract is dried over magnesium sulfate. Evaporation of the solvent and treatment of the residue with water containing a small amount of ethanol affords 18.0 g .of 2,2-dihydroxy - N - (3,4-dimethoxyphenethyl) acetamide, diacetate, M.P. 105–108° C. (from ethanol).

The α,α-diacetoxyacetyl chloride is prepared by heating 64.0 g. of glyoxylic acid monohydrate 480 ml. of acetic anhydride and 160 ml. of acetic acid on a steam bath for 2 hours. The solvents are removed and the residue is dissolved in 350 ml. of methylene chloride and treated with 180 ml. of thionyl chloride and the mixture is refluxed for 20 minutes, then evaporated on a rotary evaporator. An additional 100 ml. of methylene chloride is added and re-evaporated to remove traces of volatile reactants.

Example II.—2,2-dihydroxy-N-(p-chlorophenethyl)-acetamide, diacetate

A solution of 20 g. of α,α-diacetoxyacetyl chloride in 100 ml. of methylene chloride is added dropwise to a cold vigorously stirred mixture of 15.6 g. of p-chlorophenethylamine, 125 ml. of methylene chloride, 125 ml. of water containing 18.0 g. of NaHCO₃, and 40 g. of ice. After the addition is complete the mixture is stirred for one hour. The two phases are separated and the methylene chloride extract is dried over magnesium sulfate. Evaporation of the solvent affords an oil that is then redissolved in ether. The ether solution is washed successively with dilute hydrochloric acid and water and dried over magnesium sulfate. Evaporation of the ether affords an oil that is converted to solid material by triturating with 3-positions of heptane and then with a small amount of ether, 2,2-dihydroxy-N-(p - chlorophenethyl)-acetamide, diacetate (4.9 g.) is obtained analytically pure, M.P. 80–82° C.

Example III.—D-threo-2,2-diacetoxy-N-[β-hydroxy-α (hydroxymethyl)-p-nitrophenethyl]-acetamide A solution of 5.83 g. (30 mmole) α,α-diacetoxyacetyl chloride in 30 ml. of methylene chloride is added dropwise over 35 minutes to a vigorously stirred mixture of 4.24 g. (20 mmole) of D-threo-2-amino-1-(p-nitrophenyl)-1,3-propane diol, 8.4 g. of sodium bicarbonate, 50 g. of ice, 30 ml. of water and 30 ml. of methylene chloride. The mixture is stirred at 5° C. for 75 minutes. The aqueous phase is decanted from the mixture and the solid is filtered and washed with water to give 8.25 g. of D-threo-2,2-diacetoxy-N[β-hydroxy-α - (hydroxymethyl)-p-nitrophenethyl]acetamide. The analytic sample is recrystallized in ethanol (M.P. 141–143° C.).

Example IV.—2,2-dihydroxy-N-(α,α-dimethylphenethyl) acetamide, diacetate

α,α - Dimethylphenethylamine is acylated with α,α - diacetoxyacetyl chloride according to the procedure described in Example I to give 2,2-dihydroxy-N-(α,α-dimethylphenethyl)acetamide, diacetate, M.P. 45–50° C. (recrystallized in 65% aqueous 2-propanol.)

Example V.—2,2-dihydroxy-N-(3,4-dimethoxyphenethyl) acetamide, diacetate (alternative procedure)

A solution of 18.1 g. of 3,4-dimethoxyphenethylamine and 10.1 g. of triethylamine in 150 ml. of methylene chloride is added dropwise with stirring to a cold, magnetically stirred solution of 20.5 g. of α,α-diacetoxyacetyl chloride in 150 ml. of methylene chloride. After the addition is complete (30 minutes) the solution is stirred for 1 hour in an ice bath. The reaction mixture is washed successively with 10% hydrochloric acid, 10% sodium bicarbonate solution and water. The methylene chloride is dried over magnesium sulfate and evaporated in vacuo. The oily residue is crystallized in 50 ml. of 2-propanol and recrystallized from 30 ml. of the same solvent to give 15.8 g. of 2,2-dihydroxy-N - (3,4 - dimethoxyphenethyl)acetamide, diacetate, M.P., 106–108° C. The product is identical in every respect to the product in Example 1.

Example VI.—2,2-dihydroxy-N-(p-chlorophenethyl) acetamide, diacetate (alternative procedure)

A solution of 31.0 g. of p-chlorophenethylamine and 21.0 g. of triethylamine in 200 ml. of methylene chloride is added dropwise to a chilled, magnetically stirred solution of 40 g. of α,α-diacetoxyacetyl chloride in 200 ml. of methylene chloride. The reaction mixture is stirred for 1 hour and then extracted successively with 10% hydrochloric acid, 10% sodium bicarbonate solution and water. The methylene chloride extract is dried over magnesium sulfate and evaporated to an oil. Treatment of the residue with ether affords 15.7 g. of 2,2-dihydroxy-N-(p-chlorophenethyl)acetamide, diacetate, M.P., 79–81° C. An additional 1.4 g. of product separates on standing. The product is identical in every respect to the material obtained in Example II.

Example VII.—2,2-dihydroxy-N-(p-chloro-α,α-dimethylphenethyl)acetamide, diacetate p-Chloro-α,α-dimethylphenethylamine is acylated with α,α-diacetoxyacetyl chloride according to the procedure of Example V to give a 57% yield of 2,2-dihydroxy-N-(p-chloro - α,α - dimethylphenethyl)acetamide, diacetate (M.P., 100–103° C., recrystallized in 80% ethanol).

Example VIII.—2,2-dihydroxy-N-(α-methylphenethyl) acetamide, diacetate d-Amphetamine is acylated with α,α-diacetoxyacetyl chloride according to the procedure of Example V to give a 43% yield of 2,2-dihydroxy-N-(α-methylphenethyl)acetamide, diacetate, M.P. 84–86° C. (recrystallized in ether).

Example IX.—2,2-dihydroxy-N-(p-methoxyphenethyl) acetamide, diacetate p-Methoxyphenethylamine is acylated with α,α-diacetoxyacetyl chloride according to the procedure of Example V to give a 53% yield of 2,2-dihydroxy-N-(p-methoxyphenethyl)-acetamide, diacetate, M.P., 58–60° C. (from ether).

Example X.—N-(3,4-dimethoxyphenethyl)-2-hydroxy-2-ethoxy-acetamide, acetate 2,2-dihydroxy-N-(3,4 - dimethoxyphenethyl)acetamide, diacetate (2.03 g., 6 mmole) is slurried in 75 ml. of absolute ethanol and treated with 1.49 g. (9.0 mmole) of disodium malonate monohydrate. The mixture is stirred at reflux (about 78° C.) in a nitrogen atmosphere for 15 hours. The undissolved solid is filtered and the filtrate is evaporated on a rotary evaporator to light yellow oil. The residue is treated with water and the two phase mixture is extracted three times with ether. The combined ether extracts are dried (MgSO₄) and evaporated to an oil. Crystallization is effected from ether-cyclohexane to afford 1.05 g. of N-(3,4-dimethoxyphenethyl)-2-hydroxy-2-ethoxyacetamide, acetate, M.P. 66–68° C.

Example XI.—N-(p-chlorophenethyl)-2-ethoxy-2-hydroxyacetamide, acetate

N-(p-chlorophenethyl) - 2,2 - dihydroxacetamide, diacetate (2.0 g.) is treated with 1.08 g. of disodium malonate in 75 ml. ethanol according to the procedure described in Example X. Crystallization of crude product in cyclohexane affords N - (p-chlorophenethyl)-2-ethoxy-2-hydroxyacetamide, acetate, M.P. 67–70° C. (1.5 g.).

Example XII.—N-[1,2-bis(3,4-dimethoxyphenyl)-ethyl] 2,2-dihydroxyacetamide, diacetate N-1,3-bis(3,4-dimethoxyphenyl)ethylamine is acylated with α,α-diacetoxyacetyl chloride according to the procedure of Example V to give 48% yield of N-[1,2-bis (3,4-dimethoxyphenyl)-ethyl] - 2,2 - dihydroxyacetamide, diacetate,, M.P. 145–147° C. (from ethanol).

Example III.—N-[α-(3,4-dimethoxyphenyl-p-methoxyphenethyl]-2,2-dihydroxy acetamide, diacetate 3 - (3,4 - dimethoxyphenyl)-p-methoxyphenethylamine is acylated with α,α-diacetoxyacetyl chloride according to the procedure of Example V to give a 39% yield of N-[α - (3,4 - dimethoxyphenyl)-p-methoxyphenethyl]-2,2-dihydroxyacetamide, diacetate, M.P. 140–143° C. (from ethanol).

Example XIV.—N-[α-(3,4-dimethoxyphenyl)phenethyl]-2,2-dihydroxyacetamide, diacetate α-(3,4-dimethoxyphenyl)phenethylamine is acylated with α,α-diacetoxyacetyl chloride according to the procedure of Example V to give 51% yield of N-[α-(3,4-dimethoxyphenyl)phenethyl] - 2,2-dihydroxyacetamide, diacetate, M.P., 124–127° C.

Example XV.—N-[1,2-bis(3,4-dimethoxyphenyl)-ethyl]-2-ethoxy-2-hydroxyacetamide, acetate N - [1,2 - bis(3,4-dimethoxyphenyl)ethyl]-2,2-dihydroxyacetamide, diacetate (2.0 g.) and 1.2 g. of disodium malonate monohydrate in 100 ml. of ethanol are refluxed for 18 hours. After exaporation of the solvent, the residue is taken up in methylene chloride, washed with water, and dried (MgSO₄). Evaporation of the methylene chloride affords an oil that solidified upon addition of ether to give 1.0 g. of N-[1,2-bis-(3,4-dimethoxyphenyl)ethyl] - 2 - ethoxy-2-hydroxyacetamide, acetate, M.P. 127–133° C.

Example XVI.—N-[α-23,4-dimethoxyphenyl-p-methoxyphenthyl]-2-ethoxy-2-hydroxyacetamide, acetate A mixture of 20 g. of N-[α-(3,4-dimethoxyphenyl)-p-methoxyphenethyl] - 2,2 - dihydroxyacetamide, diacetate and 16 g. of disodium malonate, monohydrate in 1200 ml. of ethanol is refluxed for 30 hours. The undissolved salt is filtered and the fitrate evaporated in vacuo. A solution of the residue in 500 ml. of methylene chloride is washed with water, dried (MgSO₄), and evaporated to give an oil. The oil crystallizes from isopropanol to give 5.4 g. of N-[α-(3,4-dimethoxyphenyl)-p-methoxyphenethyl]-2-ethoxy-2-hydroxyacetamide, acetate, M.P., 115–118° C.

Additional product separates from the isopropanol filtrate in different crystalline modification from the original material. The melting point (M.P. 98–100° C.) and the solid state infrared spectrum (KBr) differ from the original material. The identical elemental analyses and the identical solution spectra of the two compounds by infrared (CHCl₃) analyses as well as by n.m.r. analyses shows that the two products are two crystalline modifications of the same compound.

Example XVII.—N-[α-(3,4-dimethoxyphenyl)phenethyl]-2-ethoxy-2-hydroxyacetamide, acetate N - [α - (3,4 - dimethoxyphenyl)phenethyl]-2,2-dihydroxyacetamide, diacetate (45.0 g.) and 36 g. of disodium malonate, monohydrate in 2100 ml. of ethanol are heated as described in Example 15. Removal of the methylene chloride solvent from the extract gives 38.7 g. of N-[α-(3,4-dimethoxyphenyl)phenethyl] - 2 - ethoxy - 2 - hydroxyacetamide, acetate. The product is characterized by its infrared spectrum that shows absorption at 3.04μ (amide NH), 5.72μ (ester CO), 5.99μ (amide CO) and 6.60μ (amide II and aromatic C=C and by conversion to a solid derivative.

Example XVIII.—(N-(3,4-dimethoxyphenethyl)2,2-dihydroxyacetamide, acetate formate To 149 g. of acetic anhydride chilled to 0° C. add gradually 69 ml. of formic acid. When the mixture to 50° C. for 10 minutes, chill and add 69 ml. of formic acid, and reheat to 50° C. for 10 minutes and again chill. Add 18.4 g. gloxylic acid monohydrate in 60 ml. of formic acid to the chilled solution and allow the mixture to stand at 27° C. for 17 hours. Remove the solvents on a rotary evaporator and repeatedly slurry the residue with toluene and evaporate.

To a portion of the residue (7.00 g.) in 60 ml. of chilled (50° C.) methylene chloride gradually add a solution of 7.25 g. of 3,4-dimethoxyphenethylamine and 4.05 g. of triethylamine in 60 ml. of methylene chloride. Stir the reaction at 5° C. for 30 minutes and at room temperature for 1 hour. Wash the reaction mixture with dilute hydrochloric acid, water, and sodium bicarbonate solution. Dry the methylene chloride solution over MgSO₄ and evaporate to an oil. Crystallize the 3,4-dimethoxyphenethyl-2,2-dihydroxyacetamide, acetate, formate from isopropanol or ether.

Example XIX.—5-chloro-2-(2,2-dihydroxyacetamido) benzamide, diacetate

To a solution of 43. g. of α,α-diacetoxyacetyl chloride in 200 ml. of 1,2-dimethoxyethane is added dropwise a solution of 64 g. of 2-amino-5-chlorobenzamide in 400 ml. of 1,2-dimethoxyethane. After the addition is complete, the reaction mixture is stirred for one hour. The amine hydrochloride by-product that separates is filtered and the filtrate is evaporated in vacuo. Treatment of the oily residue with ethanol yields 21.1 g. of 5-chloro-2-(2,2-dihydroxyacetamido)benzamide, diacetate, M.P. 162–165°. A portion of the material is recrystallized in ethanol for analysis (M.P. unchanged).

Example XX.—4'-chloro-2,2-dihydroxyacetanilide, diacetate

To a stirred, refluxing solution of 9.75 g. (0.05 mole) of 2,2-diacetoxyacetyl chloride in 100 ml. of methylene chloride is added (over 15 min.) a solution of 6.37 g. (0.05 mole) of p-chloroanilide in 40 ml. of methylene chloride. The mixture is refluxed for an additional 15 minutes and chilled in an ice bath. The hydrochloride salt that separates is filtered, and the filtrate is evaporated to an oil. An ether solution of the oil is washed successively with water, dilute sodium bicarbonate solution, and saturated salt solution and dried over MgSO₄. Evaporation of the ether gave an oil that crystallized spontaneously. The crude solid (M.P. 95–100°) is recrystallized by dissolving in 60 ml. of 2-methoxyethanol and diluting the solution with 30 ml. of water. Filtration of the crystals gave 6.92 g. of 4'-chloro-2,2-dihydroxyacetanilide, diacetate, M.P. 105–107°.

Example XXI.—2',6'-dichloro-2,2-dihydroxyacetanilide, diacetate

To a stirred refluxing solution of 4.86 g. of α,α-diacetoxyacetyl chloride in 75 ml. of methylene chloride is added a solution of 8.10 g. of 2,6-dichloroanilide in 40 ml. of methylene chloride. Addition of the amine is stopped after half of the solution is added and an additional 4.86 g. of 2,2-diacetoxyacetyl chloride is added in one portion to the reaction vessel. The remainder of the 2,6-dichloroaniline solution is added rapidly so that the total addition time is 30 minutes. After 4 hours reaction time, the solvent is evaporated in vacuo and the residual oil is dissolved in 100 ml. of EtOH, warmed and diluted with 200 ml. of water. Filtration of the colorless crystals yields 12.41 g. of 2',6'-dichloro-2,2-dihydroxyacetanilide, diacetate, M.P. 103–105°.

A second reaction yields a crystalline modification of the product (M.P. 116–119°). The ir spectrum (KBr) of the modification exhibited only 2 carbonyl bands at $5.63\mu$ and $5.95\mu$ among other bands. Infrared spectra in $CHCl_3$ of both modifications are identical and exhibited carbonyl bands at $5.66\mu$ (broad) and $5.82\mu$.

Example XXII.—5'-chloro-2,2-dihydroxy-2',4'-disulfamoyl-acetanilide, diacetate 5-chloro-2,4-disulfamoylaniline (4.28 g., 0.015 mole) and 3.22 g. (0.0165 mole) of α,α-diacetoxyacetyl chloride in 50 ml. of p-dioxane are heated at reflux for 48 hours. Evaporation of the solvent on a rotary evaporator and treatment of the residue with 50% aqueous ethanol yields tanilide, diacetate, M.P. 195–196°.

Example XXIII.—4'-chloro-2,2-dihydroxy-2'-(α-hydroxybenzyl)acetanilide, 2,2-diacetate To a stirred, chilled (5°) mixture of 7.00 g. (0.030 mole) of 2-(α-hydroxybenzyl)-4-chloroaniline, 5.5 g. sodium bicarbonate, 30 ml. of water, and 50 ml. of ethyl ether are added dropwise a solution of 6.40 g. (0.033 mole) of α,α-diacetoxyacetyl chloride in 30 ml. of ether. After the addition is complete (20 minutes) the mixture is stirred for one hour at 5°. The ether phase is separated, washed with water, and dried over $MgSO_4$. Evaporation of the solvent yields an oil that crystallizes spontaneously. Recrystallization in ethanol yields 6.63 g. of 4'-chloro-2,2-dihydroxy-2'-(α-hydroxybenzyl)acetanilide, 2,2-diacetate, M.P. 118–120°.

Example XXIV.—2,2-dihydroxy-N-methylacetanilide, diacetate

To a stirred solution of 21.4 g. (0.11 mole) of α,α-diacetoxyacetyl chloride in 300 ml. of methylene chloride is added dropwise over 40 minutes a solution of 10.7 g. (0.10 mole) of N-methylaniline and 10.1 g. (0.10 mole) of triethylamine in 200 ml. of methylene chloride. The reaction mixture, which becomes deep red after 70 minutes, is poured into water. The methylene chloride phase is washed successively with 1 N hydrochloric acid, water, sodium carbonate solution, and water, and is dried over $MgSO_4$. Evaporation in vacuo left an oil that crystallized when treated with 50% aqueous ethanol to give 15.99 g. of 2,2-dihydroxy-N-methylacetanilide, diacetate, M.P. 109–110°.

Example XXV.—N-(3,4-dimethoxybenzyl)-2,2-dihydroxyacetamide, diacetate

To a stirred solution of 30 g. of α,α-diacetoxyacetyl chloride in 200 ml. of methylene chloride at 5° C. is added over 2 hours a solution of 25 g. of veratryl amine, and 15 g. of triethylamine in 250 ml. of methylene chloride. After the addition is complete the mixture is stirred for one hour at 5° and allowed to warm to room temperature. The mixture is poured into water and the methylene chloride layer is separated. The methylene chloride is washed with three portions of water and dried over $MgSO_4$. Evaporation of the solvent yields an oil that crystallized on treatment with 120 ml. of hot ethanol. The preparation yields 27.4 g. (56%) of N-(3,4-dimethoxybenzyl)-2,2-dihydroxyacetamide, diacetate, M.P. 121–123°.

Example XXVI.—5'-chloro-2,2-dihydroxy-2'-sulfamoyl-acetanilide, diacetate 2,2-diacetoxyacetyl chloride (21.5 g., 0.111 mole) in 75 ml. of p-dioxane is added to a slurry of 20.7 g. (0.100 mole) of 2-amino-4-chlorobenzesulfonamide in 125 ml. of p-dioxane. The stirred mixture is heated at reflux under a nitrogen atmosphere for 16 hours. The warm solution is filtered and concentrated in vacuo to an amber oil. The residue dissolved in 75 ml. of ethanol is diluted with 75 ml. of water and seeded to induce crystallization. Filtration of the crystals gave 20.31 g. of 5'-chloro-2,2-dihydroxy-2'-sulfamoylacetanilide, M.P. 148–150°.

Example XXVII.—2,2-dihydroxy-N-(3,4,5-trimethoxyphenethyl)acetamide diacetate

Mescaline (obtained from basifying 1.993 g. of mescaline sulfate) is acylated with α,α-diacetoxyacetyl chloride (1.94 g.) according to the procedure of Example XXV to give 1.655 g. of 2,2 - dihydroxy - N - (3,4,5-trimethoxyphenethylacetamide, diacetate (M.P. 91.5–93.0°, crystallized in ether-methylene chloride.)

Example XXVIII.—N-(p-chlorobenzyl)-2,2-dihydroxyacetamide, diacetate

N-p-chlorobenzylamine is acylated with α,α-diacetoxyacetyl chloride according to the procedure of Example XXV to give 28.8% yield of N-(p-chlorobenzyl)-2,2-dihydroxyacetamide, diacetate (M.P. 87–98.5°, recrystallized two times in ether and one time in isopropanol.

Example XXIX.—N-benzyl-2,2-dihydroxyacetamide, diacetate

Benzylamine is acylated with α,α - diacetoxyacetyl chloride according to the procedure of Example XXV to give a 6.3% yield of N-benzyl - 2,2 - dihydroxyacetamide, diacetate (M.P. 66–68°, recrystallized from ether.) By analogous procedures, the following 2,2-dihydroxy-N-(phenethyl) acetamide, diacetates, are obtained:

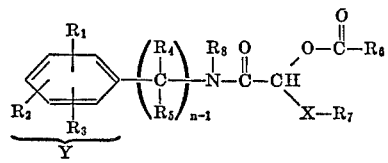

| Y | n | X | $R_4$ | $R_5$ | $R_6$ | $R_7$ | $R_8$ |
|---|---|---|---|---|---|---|---|
| $CH_3$—⟨⟩— | 2 | O–C(=O) | H | H | $CH_3$ | $CH_3$ | H |
| $CH_3(CH_2)_5$—⟨⟩— | 1 | O–C(=O) | H | H | $CH_3$ | $CH_3$ | H |
| $CH_3(CH_2)_5O$—⟨⟩— | 2 | O–C(=O) | H | H | $CH_3$ | $CH_3$ | H |
| Br—⟨⟩— | 2 | O–C(=O) | $CH_3$ | $CH_3$ | $CH_3$ | $CH_3$ | H |

| Y | n | X | R4 | R5 | R6 | R7 | R8 |
|---|---|---|---|---|---|---|---|
| I-C6H4- | 1 | O-C(=O) | CH3 | CH3 | CH3 | CH3 | H |
| F-C6H4- | 2 | O-C(=O) | CH3 | CH3 | CH3 | CH3 | H |
| HO-C6H4- | 1 | O-C(=O) | H | H | CH3 | CH3 | H |
| CH3O2C-C6H4- | 2 | O-C(=O) | H | H | CH3 | CH3 | H |
| CH3(CH2)5O2C-C6H4- | 2 | O-C(=O) | H | H | CH3 | CH3 | H |
| 3,4-(CH3O)2-C6H3- | 1 | O-C(=O) | H | H | CH3 | CH3 | H |
| 2,4-(CH3)2-C6H3- | 2 | O-C(=O) | H | H | CH3 | CH3 | C6H5 |
| 2,4-Cl2-C6H3- | 1 | O-C(=O) | H | H | CH3 | CH3 | CH3 |
| 2,6-(CH3O)2-C6H3- | 2 | O-C(=O) | H | H | CH3 | CH3 | C2H5 |
| CH3O-C6H3(I)- | 2 | O-C(=O) | H | H | CH3 | CH3 | H |
| C6H5- | 1 | O-C(=O) | -OCH3 | H | H | H | H |
| C6H5- | 2 | O=C | CH3(CH2)5 | CH3(CH2)5 | H | H | H |
| C6H5- | 2 | O-C(=O) | CH2OH | CH3(CH2)5 | CH3 | CH3 | H |
| (CH3COO)2CHCONH-C6H4- | 1 | O-C(=O) | H | H | CH3 | CH3 | H |
| C6H5- | 2 | O-C(=O) | H | CH3 | CH3 | CH3 | H |
| C6H5- | 1 | O-C(=O) | CH3O- | H | CH3 | CH3 | H |

We claim:
1. A compound selected from the group consisting of:

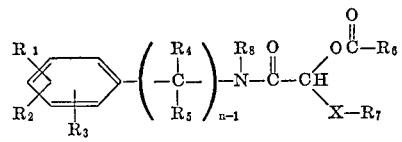

wherein X is selected from the group consisting of

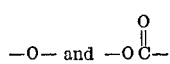

R1, R2, and R3 are selected from the group consisting of hydrogen, (lower)alkyl, (lower)alkoxy, halogen, hydroxy, nitro, carbo(lower) alkoxy, sulfamyl, carbamyl, trifluoromethyl, α - hydroxybenzyl and 2,2 - di(lower) alkanoyloxyacetamido; R4 and R5 are selected from the group consisting of hydrogen, (lower)alkyl, hydroxymethyl, phenyl, (lower)alkoxy, hydroxy, (lower)alkoxyphenyl and di(lower)alkoxyphenyl; R7 is selected from the group consisting of lower)alkyl and hydrogen with the proviso that where X is —O—, R7 is (lower)alkyl; R6 is (lower)alkyl; R8 is H, (lower)alkyl or phenyl; and n is an integer of 1 to 3.

2. A compound as defined in claim 1 which is 2,2-dihydroxy - N - (3,4 - dimethoxy-phenethyl)-acetamide, diacetate.

3. A compound as defined in claim 1 which is 2,2-dihydroxy - N - (p - chlorophenethyl) - acetamide, diacetate.

4. A compound as defined in claim 1 which is D-threo - 2,2 - diacetoxy-N-[β-hydroxy-α-(hydroxymethyl)-p-nitrophenethyl]-acetamide.

5. A compound as defined in claim 1 which is 2,2-dihydroxy - N - (α,α-dimethylphenethyl)-acetamide, diacetate.

6. A compound as defined in claim 1 which is 2,2-dihydroxy - N - (3,4 - dimethoxyphenethyl)-acetamide, diacetate.

7. A compound as defined in claim 1 which is 2,2-dihydroxy - N - (p - chlorophenethyl) - acetamide, diacetate.

8. A compound as defined in claim 1 which is 2,2-dihydroxy - N - (p - chloro - α,α - dimethyl-phenethyl) acetamide, diacetate.

9. A compound as defined in claim 1 which is 2,2-dihydroxy - N - (α - methylphenethyl)-acetamide, diacetate.

10. A compound as defined in claim 1 which is 2,2-dihydroxy - N - (p - methoxyphenethyl) - acetamide, diacetate.

11. A compound as defined in claim 1 which is N-(3,4 - dimethoxyphenethyl) - 2 - hydroxy - 2 - ethoxyacetamide, acetate.

12. A compound as defined in claim 1 which is N-(p-chloro-phenethyl) - 2 - ethoxy - 2 - hydroxyacetamide, acetate.

13. A compound as defined in claim 1 which is N-[1,2 - bis(3,4 - dimethoxyphenyl)-ethyl] - 2,2 - dihydroxyacetamide, diacetate.

14. A compound as defined in claim 1 which is N-[α-(3,4 - dimethoxyphenyl) - p - methoxyphenethyl]-2,2-dihydroxy-acetamide, diacetate.

15. A compound as defined in claim 1 which is N-[α-(3,4 - dimethoxyphenyl)phenethyl] - 2,2 - dihydroxy acetamide, diacetate.

16. A compound as defined in claim 1 which is N-[1,2 - bis (3,4 - dimethoxyphenyl)-ethyl]2 - ethoxy-2-hydroxyacetamide, diacetate.

17. A compound as defined in claim 1 which is N-[α-(3,4 - dimethoxyphenyl) - p - methoxyphenethyl]-2-ethoxy-2-hydroxyacetamide, acetate.

18. A compound as defined in claim 1 which is N-[α-(3,4 - dimethoxyphenyl)phenethyl] - 2 - ethoxy-2-hydroxyacetamide, acetate.

19. A compound as defined in claim 1 which is N-(3,4 - dimethoxyphenyl) - 2,2 - dihydroxyacetamide, acetate formate.

20. A compound as defined in claim 1 which is 5-chloro - 2 - (2,2 - dihydroxyacetamide)benzamide, diacetate.

21. A compound as defined in claim 1 which is 4'-chloro - 2,2 - dihydroxyacetanilide, diacetate.

22. A compound as defined in claim 1 which is 2',6'-dichloro-2,2-dihydroxyacetanilide, diacetate.

23. A compound as defined in claim 1 which is 5'-chloro - 2,2 - dihydroxy - 2',4' - disulfamoylacetanilide, diacetate.

24. A compound as defined in claim 1 which is 4'-chloro - 2,2 - dihydroxy - 2' - (α-hydroxybenzyl)acetanilide, 2,2-diacetate.

25. A compound as defined in claim 1 which is 2,2-dihydroxy-N-methylacetanilide, diacetate.

26. A compound as defined in claim 1 which is N-(3,4 - dimethoxybenzyl) - 2,2 - dihydroxyacetamide, diacetate.

27. A compound as defined in claim 1 which is 5'-chloro - 2,2 - dihydroxy - 2' - sulfamoylacetanilide, diacetate.

28. A compound as defined in claim 1 which is 2,2-dihydroxy - N - (3,4,5 - trimethoxyphenethyl)acetamide, diacetate.

29. A compound as defined in claim 1 which is N-(p-chloro-benzyy)-2,2-dihydroxyacetamide, diacetate.

30. A compound as defined in claim 1 which is N-benzyl-2,2-dihydroxyacetamide, diacetate.

References Cited

Chemical Abstracts, 52: 6262 c, 53: 10109 c, d.

LORRAINE A. WEINBERGER, Primary Examiner

V. GARNER, Assistant Examiner

U.S. Cl. X.R.

260—471 A, 488 J, 491, 570.8 R; 424—309, 311